Sept. 4, 1962   H. H. NEEDHAM   3,052,021
METHOD OF FORMING A MULTI-LAYER HEAD
Filed Dec. 7, 1956

INVENTOR.
HOWARD H. NEEDHAM
BY Andrus + Scales
Attorneys

United States Patent Office 3,052,021
Patented Sept. 4, 1962

3,052,021
METHOD OF FORMING A MULTI-LAYER HEAD
Howard H. Needham, Wauwatosa, Wis., assignor to A. O. Smith Corporation, Milwaukee, Wis., a corporation of New York
Filed Dec. 7, 1956, Ser. No. 626,995
4 Claims. (Cl. 29—471.1)

This invention relates to a method of fabricating a segmental multi-layer head for pressure vessels.

In industry there is a demand for pressure vessels to be used in high pressure and temperature operations. To obtain the required physical properties to withstand these conditions, multi-layer vessels are often employed. The multi-layer vessel is formed of a cylindrical shell composed of a plurality of metal layers assembled tightly one about the other and a pair of heads which enclose the ends of the shell.

The present invention is directed to a method of fabricating a multi-layer segmental head in which each segment of the head is composed of a plurality of thin metal layers or sheets tightly disposed on one another and having a contour of a portion of a sphere. According to the invention, the adjacent layers in each segment are secured together to maintain alignment of the layers by a cured thermosetting resin adhesive. The edges of each segment are then prepared for welding and the adjacent edges of adjoining segments are subsequently welded to provide an integral head structure.

The adhesive bond between the layers serves to maintain the layers in tight relation during the scarfing, assembling and welding operations and prevents deformation of the layers.

The multi-layer head is strong and efficient in operation and may be readily and economically fabricated by the method of the invention. At high operating temperatures and pressures, the adhesive bond between the layers may break to permit the layers to move or adjust relatively to each other to distribute stresses resulting from the internal pressure. Furthermore, by varying the numbers of layers, any desired strength and thickness can be obtained in the head.

The multi-layer head eliminates the necessity for stress relieving because the forming and welding of the thin layers or sheets does not produce strains in the metal of an order requiring stress relieving.

As only the inside layer of the multi-layer head requires X-ray inspection, this greatly simplifies the inspection procedure and makes possible a more accurate disclosure of small flaws in the welding inasmuch as only welds between thin plates are inspected.

The multi-layer construction also results in a stronger head for a given thickness due to the higher tensile strength inherent in a multi-layer thin plate structure.

Other objects of the invention will appear in the course of the following description.

The drawing illustrates the best mode presently contemplated of carrying out the invention.

Figure 1:
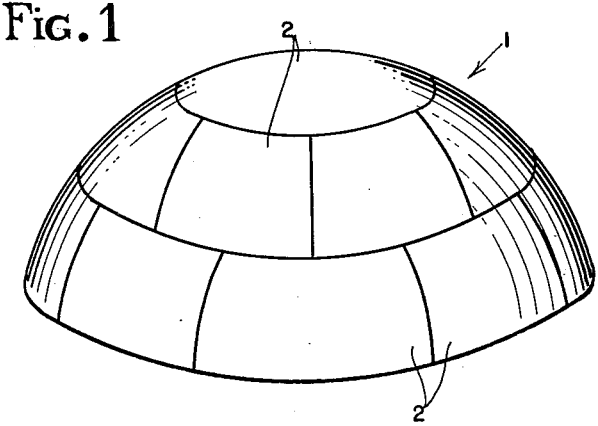
FIGURE 1 is a perspective view of the assembled multi-layer segmental head.
Figure 2:
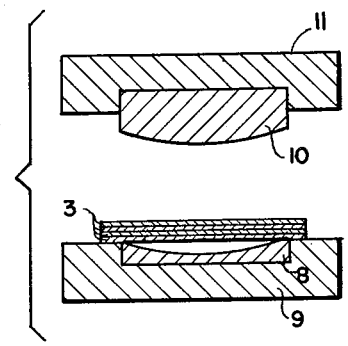
FIG. 2 is a diagrammatic showing of a stack of thin plates in the die assembly before the forming operation.

The drawing illustrates a segmental multi-layer head 1 which is adapted to enclose the ends of a generally cylindrical pressure vessel or the like. The head is formed of a plurality of segments 2 having a surface contour of a portion of a sphere and which are secured together along their adjoining edges by welding to form the head.

Each of the segments 2 is composed of a plurality of thin metal plates 3 which are tightly disposed on one another. Each of the plates 3 has a surface contour of a portion of a sphere.

To hold the plates 3 together as a unit and maintain alignment of the plates for machining and welding, an adhesive 4 is disposed between the adjacent plates. The adhesive 4 has a high shear strength and the plates 3 cannot slide or slip on one another and thereby will not separate.

The adhesive may be applied in spaced locations between the plates as shown in the drawing or it can be applied as a substantially continuous layer covering the larger portion of the surface area of the plates.

The adhesive 4 may take the form of any of the conventional thermosetting resins commonly used for bonding metals. For example, the adhesive may be a thermosetting polyester resin such as a polyester resin in which at least one of the reactants contains an unsaturated double bond in an aliphatic group. For example, the unsaturated bond may be in the polybasic acid component such as when maleic acid or anhydride is reacted with a polyhydric alcohol such as glycerol, ethylene glycol, diethylene glycol, propylene glycol, sorbitol, mannitol, pentaerythritol, polyethylene glycol and the like. In addition thermosetting resins of the diallylphthalate, epoxide, furane, phenolic, melamine and vinyl types and the like may also be employed as the resin coating for the bonding areas.

Figure 4:
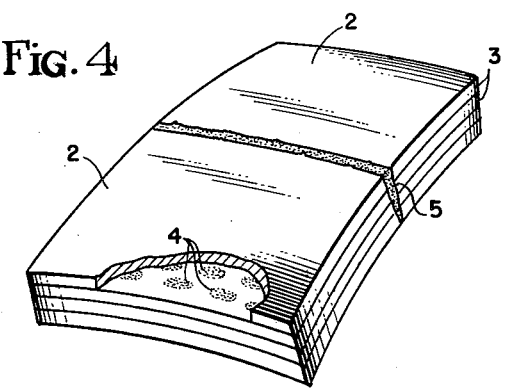
FIG. 4 is a perspective view of two multi-layer segments welded together.
Figure 3:
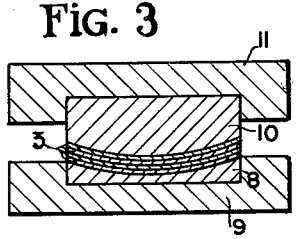
FIG. 3 is a view similar to FIG. 2 showing the forming of the plates.

The opposed edges of the segments are joined together by welds 5, as best shown in FIG. 4, to complete the head structure.

Figure 5:
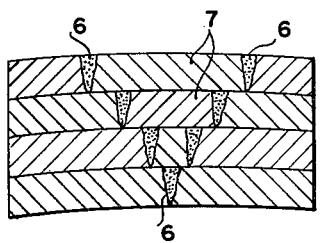
FIG. 5 is an enlarged fragmentary section showing a modified form of welding the opposed edges of the segment in which the welds are staggered.

Under certain conditions it may be desired to stagger the welds between the opposed edges of the plates 3, as shown in FIG. 5. In this regard, the edges of the plates are machined or scarfed and the opposed edges of the innermost plates 3 are joined directly together by welds 6. A plate 7 of suitable size and surface contour is welded between the edges of each succeeding pair of plates 3. In this manner the welds 6 are not in alignment but are staggered.

In the fabrication of the multi-layer head, the plates 3 should generally first be descaled and cleaned by conventional procedures. The plates 3 are then stacked in superimposed relation on the upper surface of a lower die 8 which is secured to a suitable base 9. The die 8 is generally concave and has a surface contour corresponding to that of a portion of a sphere.

The uncured resin adhesive is then applied between the plates 3, and an upper die 10, which is supported by a die support 11 and has a convex contour complementing the die 8, is lowered toward die 8 to form the plates 3 between the dies. The dies 8 and 10 are maintained in the closed position until the resin adhesive 4 has cured. Heat can be applied to the dies to accelerate the curing of the resin.

After curing of the resin the dies are opened and the composite structure or segment 2 is removed. The edges of each segment are then prepared for welding and subsequently welded together to form the completed head.

While the description has shown the adhesive 4 being applied between the plates 3 prior to forming, it is contemplated that the plates 3 can be formed singularly or as a unit. In this case the adhesive is applied between the formed plates and the composite structure subjected to pressure during curing of the resin adhesive.

Figure 6:
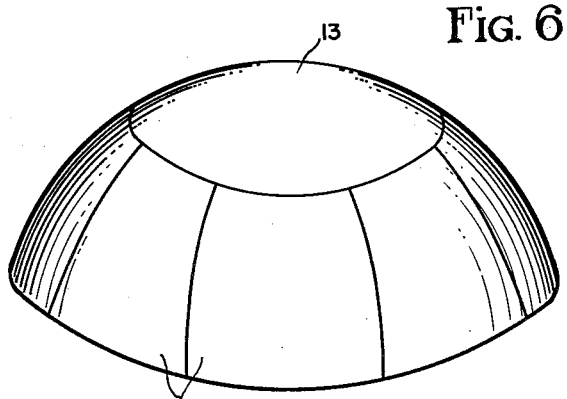
FIG. 6 is a second form of the invention showing segments of a modified shape.

The use of a spherical contour can result in all of the plates 3 being formed in a single set of dies and this substantially reduces the forming cost of making a multi-layer head. As shown in FIGURE 1, the segments 2 are all provided with the same radius and thus all of the plates making up the segments can be formed in the same die. In the structure shown in FIG. 6, the head is composed of two sets of segments which have different radii. In this construction, the base segments 12 have a different radius than that of the cap 13 and therefore two sets of dies are required, one for the base segments 12 and the other for the cap 13.

The present invention provides an improved method of fabricating a multi-layer head for a pressure vessel in which the resin adhesive bond between the layers serves to maintain the layers in alignment during scarfing and welding.

Various modes of carrying out the invention are contemplated as being within the scope of the following claims particularly pointing out and distinctly claiming the subject matter which is regarded as the invention.

I claim:

1. A method of fabricating a multi-layer head for a pressure vessel, comprising the steps of applying a quantity of an uncured thermosetting resin to at least one side of each of a plurality of metal plates, stacking said plates in superimposed relation in a manner such that there is a quantity of said resin between each of said plates, applying pressure to the stack to deform the plates to a generally curved surface contour to form a segment of the head curing the resin, welding the edges of the segment to the opposed edges of adjacent segments formed in the same manner and repeating the steps of forming and welding the segments to each other until said head is complete, and breaking the resin bond between the several plates of each of the segments during use of said pressure head in order to allow relative movement between the several plates in each of the segments.

2. A method of fabricating a multi-layer head for a pressure vessel or the like, comprising the steps of forming a series of metal plates to provide the plates with a surface contour of a portion of a sphere, applying a quantity of an uncured thermosetting resin to at least one side of each of said metal plates, nesting the formed metal plates together in superimposed relation in a manner such that there is a quantity of said resin between each of said plates, curing the resin while applying pressure to the plates to form a segment of the head, welding the edges of the segment to the opposed edges of adjacent segments formed in the same manner and repeating the steps of forming and welding the segments to each other until said head is complete, and breaking the resin bond between the several plates of each of the segments during use of said pressure head in order to allow relative movement between the several plates in each of the segments.

3. A method of fabricating a multi-layer head for a pressure vessel or the like, comprising the steps of applying a quantity of a thermosetting resin adhesive to at least one side of each of a plurality of metal plates, stacking said plates in superimposed relation in a manner such that there is a quantity of said adhesive between each of said plates with the adhesive being spaced from the edges of said plates, deforming the stack in at least two planes to provide the stack with a surface contour of a portion of a sphere and form a segment of the head, curing the resin to form a frangible bond whereby said plates will be held during welding but will move relative to each other due to rupture of said bond in the use of said pressure head, and welding the edges of the segment to the opposed edges of adjacent segments formed in the same manner and repeating the steps of forming and welding the segments to each other until said head is complete.

4. A method of fabricating a multi-layer head for a pressure vessel, comprising the steps of forming a series of metal plates to provide the plates with a surface contour of a portion of a sphere, applying a quantity of an adhesive to at least one side of each said metal plates, nesting the formed plates together in superimposed relation to form a segment of a sphere in a manner such that there is a quantity of adhesive between each of said plates said adhesive forming a frangible bond between the plates, whereby said plates will be held during welding but will move relative to each other due to rupture of said bond in the use of said pressure head, welding the edges of said segment to the opposed edges of adjacent segments formed in the same manner and repeating the foregoing steps until the head is complete.

References Cited in the file of this patent

UNITED STATES PATENTS

| | | |
|---|---|---|
| Re. 22,251 | Stresau | Jan. 12, 1943 |
| 1,993,254 | Booth | Mar. 5, 1935 |
| 2,118,388 | Zerbe | May 24, 1938 |
| 2,365,696 | Grubb | Dec. 26, 1944 |
| 2,654,686 | Hansen | Oct. 6, 1953 |